(12) United States Patent
Derbez et al.

(10) Patent No.: US 11,977,177 B2
(45) Date of Patent: May 7, 2024

(54) METHOD TO CORRECT PHASE AMBIGUITY IN RANGE AND PHASE MEASUREMENTS TRANSITIONS

(71) Applicant: XCO Tech Inc., West Penticton (CA)

(72) Inventors: Eric Derbez, Vancouver (CA); Scott Stephens, Scottsdale, AZ (US)

(*) Notice: Subject to any disclaimer, the term of this patent is extended or adjusted under 35 U.S.C. 154(b) by 161 days.

(21) Appl. No.: 17/420,781

(22) PCT Filed: Dec. 27, 2019

(86) PCT No.: PCT/IB2019/061408
§ 371 (c)(1),
(2) Date: Jul. 6, 2021

(87) PCT Pub. No.: WO2020/141422
PCT Pub. Date: Jul. 9, 2020

(65) Prior Publication Data
US 2022/0113372 A1 Apr. 14, 2022

Related U.S. Application Data

(60) Provisional application No. 62/788,797, filed on Jan. 5, 2019.

(51) Int. Cl.
*G01S 7/292* (2006.01)
*G01S 7/40* (2006.01)

(52) U.S. Cl.
CPC .......... *G01S 7/2926* (2013.01); *G01S 7/4021* (2013.01)

(58) Field of Classification Search
CPC .......... G01S 11/04; G01S 13/74; G01S 13/84; G01S 5/017; G01S 5/0205; G01S 5/0268; G01S 7/2926; G01S 7/4021
See application file for complete search history.

(56) References Cited

U.S. PATENT DOCUMENTS

| | | | |
|---|---|---|---|
| 2010/0166044 A1 | 7/2010 | Offer | |
| 2013/0201003 A1* | 8/2013 | Sabesan | G01S 13/878 340/10.1 |
| 2014/0207374 A1* | 7/2014 | Taylor, Jr. | G01S 13/84 701/470 |
| 2017/0353940 A1* | 12/2017 | Seth | G01S 5/0218 |
| 2018/0045807 A1 | 2/2018 | Senna et al. | |

(Continued)

FOREIGN PATENT DOCUMENTS

WO 2017/079839 A1 5/2017

OTHER PUBLICATIONS

Genovese, A. "The interacting Multiple Model Algorithm for Accurate State Estimation of Maneuvering Targets" John Hoplins APL Technical Digest, 2001, pp. 614-623, vol. 22, No. 4.

(Continued)

*Primary Examiner* — Timothy X Pham
(74) *Attorney, Agent, or Firm* — Larson & Anderson, LLC

(57) ABSTRACT

There is provided a subject location system, including a master processing unit, a receiver, and at least one Tag associated with the subject. The system includes a Hub with a master processing unit and the Tag includes transponders. Range and phase data are used to calculate the position of the Tag in relation to the Hub, and phase cycle errors are eliminated by, the use of a cyclical search minimizing an innovation inner product.

22 Claims, 7 Drawing Sheets

(56) References Cited

U.S. PATENT DOCUMENTS

| | | | |
|---|---|---|---|
| 2018/0260593 A1* | 9/2018 | Enomoto | G06K 7/10435 |
| 2020/0096599 A1* | 3/2020 | Hewett | G07G 1/009 |

OTHER PUBLICATIONS

Gaffney, B. "Considerations and challenges in Real Time Locating Systems Design" DecaWave, 2008; retrived from https://www.decawave.com/sites/default/files/resources/decawave_paper_on_rtls_0.pdf.

Jonge, P. et al. "The LAMBDA-method for integer ambiguity estimation: implementation aspects" Delft: Delft Geodetic Computing Centre; 1996.

Mahfouz, M. et al. "Investigation of High-Accuracy Indoor 3-D Positioning using UWB Technology" IEEE Transactions on Microwave Theory and Techniques, 2008, pp. 1316-1330, vol. 56, No. 6.

Martinelli, F. et al. "A Robot Localization System Combining RSSI and Phase Shift in UHF-RFID Signals," in IEEE Transactions on Control Systems Technology, vol. 23, No. 5, pp. 1782-1796, Sep. 2015, doi: 10.1109/TCST.2014.2386777.

Wan, E. et al. "The Unscented Kalman Filter for Nonlinear Estimations" in IEEE 2000 Adaptive Systems for Signal Processing, Communications, and Control Symposium, 2000, pp. 153-158, DOI: 10.1109/ASSPCC.2000.882463.

* cited by examiner

METHOD TO CORRECT PHASE AMBIGUITY IN RANGE AND PHASE MEASUREMENTS TRANSITIONS

CROSS-REFERENCE TO RELATED APPLICATIONS

Priority is claimed from U.S. provisional application 62/788,797 filed Jan. 5, 2019.

BACKGROUND

Field

The subject matter disclosed generally relates to accurate location and orientation of objects in three dimensional space for sport and medical applications. More particularly, the invention relates to increasing the accuracy and precision when calculating position of a subject in motion.

The dynamic position determination of movable objects, animals or people using wireless positioning and tracking is established. However, many known wireless positioning and tracking systems and methods are limited in usefulness by cost, size of equipment, speed, accuracy, and "noise" in the data.

Historically, some positioning and tracking systems relied on long-range tracking signals such as Global Positioning System (GPS) and related Galileo or GLONASS systems based on the transmission of tracking signals from satellite stations. Such systems are not reliable in sheltered or indoor environments. Other systems utilize short-range positioning and tracking based on existing wireless data communication signal systems such as WiFi, Bluetooth™ and Zigbee™. Such short-range systems are susceptible to degradation from obstacles and have limited range as they are designed primarily for data transmission rather than positioning or tracking.

Position tracking systems based on ultrawideband (UWB) wireless signal transmission have been developed. These systems use the relatively precise time measurement provided by UWB pulse signals and associated receivers to provide positioning and tracking based on measuring time of flight of UWB signals between tracking antennae and a "Tag" antenna(e) affixed to an object, animal or person to be tracked. A combination of these methods was refined as Real-Time Kinematic (RTK) for use in kinesiology as disclosed in PCT Publication no. WO2017079839 by McMillan et al.

In further work by this group (unpublished), radiofrequency signal (RF) to provide a range was combined with UWB phase information to establish position.

The detailed calculation of the position of an object requires improvement because the variance in RF range accuracy is about ten times the variance in-phase information. Also, although the carrier phase is more precise, phase is only known modulo the carrier wavelength, and thus can cause lower accuracy if not integrated correctly with range measurements.

The standard method for determining the integer ambiguities is LAMBDA or the "Least-squares AMBiguity Decorrelation Adjustment method" (Jonge and Tiberius 1996) can be used to reconstruct the entire range from phase information. LAMBDA is computationally expensive in this context, taking 30 or more seconds on a high-performance CPU.

The Extended Kalman Filter (UKF) can calculate a good first rough position for a Tag associated with an object being tracked using only range and single difference ranges. This rough position is good enough if the Tag is stationary. However, when the Tag is in motion, the filter can incorporate cycle slips as can happen in RTK, with the wrong integer ambiguity resolution. From that point on, all subsequent position solutions would be biased.

SUMMARY

According to embodiments of the invention, there is provided a subject location system, having a master processing unit (MPU) and receiver; Sensors associated with the master processing unit housed in a Hub; and a Tag associated with the subject; the Tag having a transponder capable of receiving and sending both a Tag-specific range signal and a Tag-specific phase signal to a corresponding Sensor in the master processing unit (MPU); and wherein the master processing unit, after initialising the Tag position by averaging a predetermined number of position solutions calculated using range signal and range difference signals (initializing average), calculates subsequent locations of each Tag position using the range signals and reconstituted single difference phase signals.

In embodiments of the invention, the choice of reconstituted single difference phase signal yielding the smallest value of the innovation inner product is subsequently used to maintain a solution with integer ambiguities consistent with the average position solution.

In embodiments, an a priori height constraint is applied to the points in the initializing average.

In embodiments, outliers in the initializing average are edited out, which means "removed" or "omitted".

In embodiments, the master processing unit is stationary and the Tag(s) can move dynamically with respect to it.

In embodiments, wherein the master processing unit moves dynamically but the Tags are stationary with respect to some reference frame.

In embodiments, the Tag(s) also measures acceleration and transmits that information to the Hub.

In embodiments, the Tag operates as an ultra-wideband transponder. In embodiments, the Tag operates as a narrow band transponder.

In embodiments, the Tag operates as a TDMA, CDMA, or FDMA transponder.

In embodiments, both the Tag(s) and subject location system may move dynamically relative to some reference frame.

In embodiments, a plurality of Tags are affixed to the subject.

In embodiments, in the absence of a signal from one or more Tags, the master processing unit continues to compute location using the available signals from the remaining operable Tag(s). This may require assuming the relative distance and orientation between Tags affixed to the subject remains constant as this difference would be required between handoffs as Tags drop in and out of processing.

In embodiments, in the absence of reception of a Tag's signal at one or more of the Hub's Sensors (e.g. due to transient line-of-sight issues), the master processing unit continues to compute location using the available signals from the remaining operable Hub Sensors. This is performed in real-time on a sample by sample basis.

BRIEF DESCRIPTION OF THE DRAWINGS

Further features and advantages of the present disclosure will become apparent from the following detailed description, taken in combination with the appended drawings, in which.

DETAILED DESCRIPTION

Figure 1:
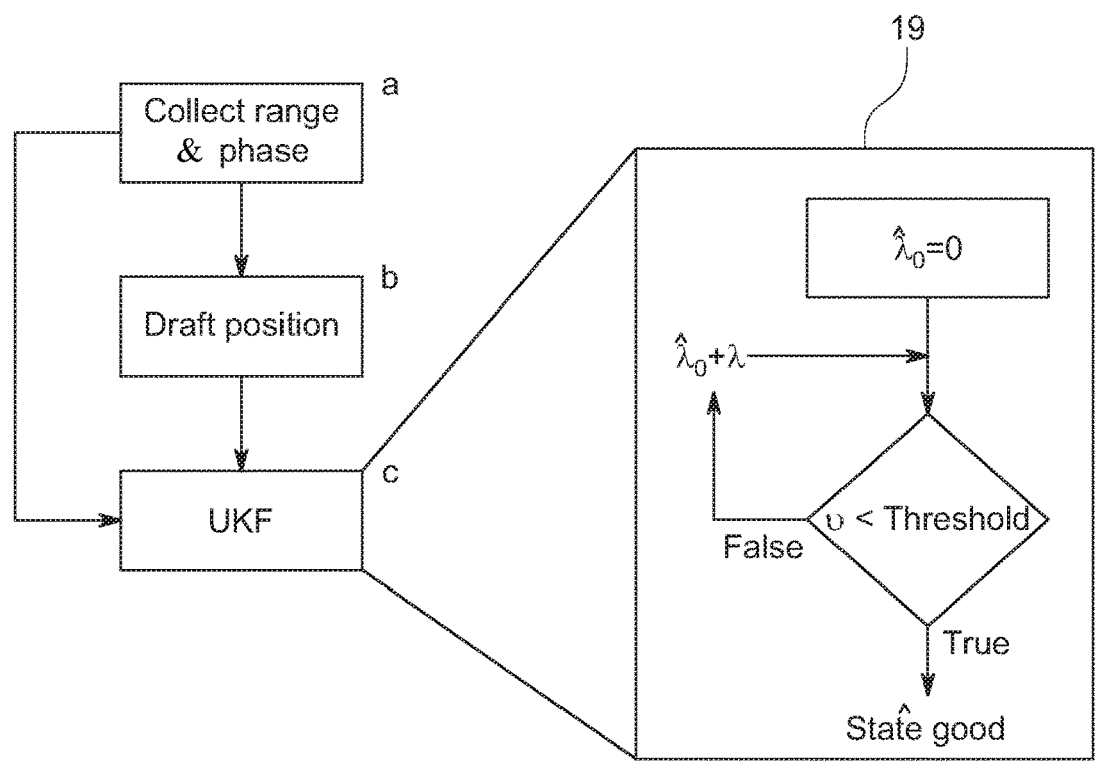
FIG. 1 illustrates a flow chart depiction of the processes implemented by the hardware of embodiments of the invention.

The following terms are defined below.

"Code Division Multiple Access" (CDMA) is a multiple channel access method used by radio communication technologies. In which different transmitters can send information simultaneously over one communication channel.

"Frequency Division Multiple Access" (FDMA) gives users an individual allocation of two or more frequency channels.

"Time Division Multiple Access" (TDMA) is a channel access method for shared-medium networks. It allows several parties to share a frequency channel by parsing the signal into different time slots.

"Unscented Kalman Filter" (UKF) is a recursive algorithm for calculating the state (eg. position, velocity, acceleration) of a non-linear dynamic system from noisy sensor measurements, where the state is only partially observable by the sensors. The estimated state information is updated by combining sensor measurements with the predicted state of the system. Prediction of state are made using the past state and a dynamical system model.

"Ultra-wideband" (UWB) is a radio technology for transmitting information in short pulses using a wide bandwidth (>500 MHz).

"Real Time Kinematic" (RTK) carrier phase mode of GPS navigation positioning is a satellite navigation technique used to enhance position data derived from Global Navigation Satellite Systems. It uses measurements of the phase of the signal's carrier wave in addition to the information content of the signal and relies on a single reference station or interpolated virtual station to provide real-time corrections over some wired or wireless link.

"Radio Frequency" (RF) is a band of frequencies for electromagnetic waves, typically in the range of 3 KHz to 300 GHz for use in telecommunications.

"Inertial Measurement Unit" (IMU), as used herein, is intended to mean an instrument that contains one accelerometer, gyro, and (optionally) magnetometer per independent axis, and relays this information to the MPU.

A "Receiver", as used herein, includes an antenna and is intended to mean a device that converts incoming electromagnetic signals into electrical signals.

"Master Processing Unit" (MPU) is intended to mean a stationary or base receiver, CPU, associated motherboard, and power supply capable of combining the Tag-specific range signal and Tag-specific phase signal measurements as received by each the Hub's Sensors by processing them through an UKF to determine an accurate location for each Tag. The subject location system CPU is programmed to process the positional data it receives, according to embodiments of the invention, to result in more accurate position determination. In embodiments, the MPU (and Sensors) is stationary relative to the Tags. In embodiments of the invention, the MPU is situated in the Hub.

A "Hub", according to embodiments of the invention, is intended to mean a system of an MPU as well as associated Sensors whose orientation and separation are accurately known.

An "Observable" herein is understood to be a physical quantity measured by a Sensor (see below), in our case range or phase; it could also be an acceleration component, rotation rate on an axis, or a magnetic field strength on an axis in the case of an IMU.

A "Sensor", as used herein, is an electromagnetic transceiver capable of determining time-of-flight via correlation against a predetermined ranging code and able to extract carrier phase information; it could also be an IMU.

A "Sprint" is an event wherein the subject to which a Tag is affixed accelerates from rest and moves directly downrange from the Hub until a desired sprint distance (e.g. 50 m dash) has been traversed.

A "Transponder", as used herein, is an RF device capable of detecting a given signal and reacting to it by responding with another signal.

A "Tag", as used herein, is a self-powered device containing a transponder, an antenna capable of receiving/transmitting both a Tag-specific range signal and a Tag-specific phase signal, The Tag according to embodiments generally has a small, portable size, and can be affixed to a subject whose dynamic position is being observed. The subject location system CPU is programmed to process the positional data it receives, according to embodiments of the invention, to result in more accurate position determination. In embodiments of the invention, the Tag may also contain an IMU platform. In embodiments of the invention, the gain pattern of the antenna is application-dependent (preferably hemispherical).

The subject, as described in the present application, is intended to mean an object, person or animal whose dynamic position is desired to be known. In preferred embodiments of the invention, the subject is mobile. In other embodiments, the subject is an unmanned autonomous vehicle or drone.

In embodiments of the invention, one or more Tags are affixed to a subject. In other embodiments of the invention, in the absence of a signal from one or more Tags, the master processing unit continues to compute location using the signals from the remaining operable Tags.

As discussed herein, Dynamic Position is used to describe a subject's position, velocity, acceleration relative to the Hub frame of reference.

Wan, Eric et al. disclose the Unscented Kalman Filter for Nonlinear Estimation in their published academic thesis, Oregon Graduate Institute of Science & Technology. (Wan and Van Der Merwe, 4 Oct. 2000). The UKF location system performs in a superior fashion in dynamic situations, using the single difference phase information. The dynamic position of a subject may be determined in part by direct measurement or detection of location and orientation, as well as continued observation. However, to quantify and remotely observe and record dynamic position, different types of data available about the subject's position and velocity and direction must be integrated. The problem is overcome by creating and re-using a UKF structure which, in embodiments of the present invention, will switch-over (hand-over) from using delta-range measurements to delta-phase measurements, while simultaneously changing measurement covariances.

This approach is unlike the brute force approach used in the LAMBDA method, as it does not directly solve for the integer ambiguities. It has the advantage of imposing the same computational load when using single difference ranges or single difference phases and keeping the processing essentially the same.

The UKF method also has the advantage of not requiring explicit linearization of the observation equations (as would be necessary for the EKF Extended Kalman Filter (Wan and Van Der Merwe 4 Oct. 2000). Indeed, in the KF formalism, the innovation is the difference between the measured single difference ranges or phases and the predicted single difference ranges or phases. Conveniently, in the UKF, the expected position state (e.g. position, velocity, acceleration) is plugged into the same observation equation, to model either the expected single difference ranges or phases. It remains to account for the difference in the measurement noise covariance (c.f. $R_{meas}$ in equation 12) of the single difference range or phase measurements, and then let the UKF sort things out.

The crux of the problem is determining when the range and single difference range based Sensor state is accurate enough to 'hand-off' to the range and single difference phase mode, and then how to stay on a solution consistent with the hand-off (since noise may cause a cycle slip).

In a preferred embodiment, an IMU onboard or associated with a Tag can be used to indicate when the latter is 'stationary'. During such a period, it is then possible to average the UKF's reported positions and/or constrain its height to an a priori value. This average position can then be used to override the UKF's state (specifically its position) before it is used with single difference phase measurements.

Alternatively, in another embodiment, in the absence of an IMU, low standard deviation values of the range measurements are used to indicate 'stationarity' of the Tag, and can be used to mark an ensemble of points to be averaged.

The embodiments of the invention edit bad UKF positions (due to noisier measurements) used in the 'hand-off' to single-phase differences by an iterative process whereby the position sample farthest from the average is edited out and the average is re-calculated.

The purpose of the embodiments of the invention is to reduce the position error to within one wavelength before switching to single difference phase measurements and handle integer cycle slips on a real-time basis.

Figure 2:
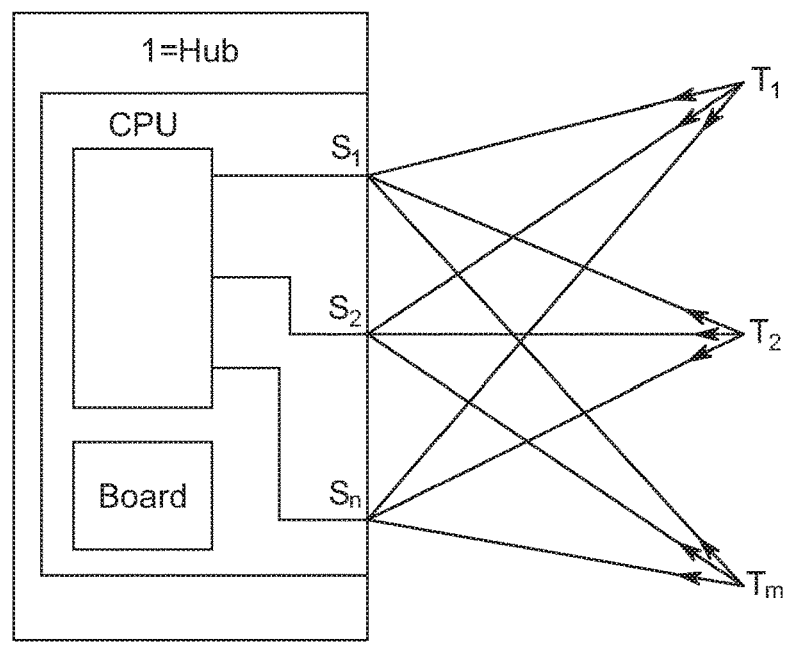
FIG. 2 illustrates the communication flow from the Tags T1,T2, . . . , Tm to Sensors S1,S2, . . . , Sn onboard the Hub according to one embodiment of the invention.

The processes described in subsequent paragraphs are written in to the software processes of a Hub including CPU and Board (see FIG. 2). The Hub has installed Sensors $S_1$, $S_2, \ldots, S_n$. These Sensors receive signals from mobile Tags $T_1, T_2, \ldots, T_m$, and use these signals to compute relative distances between these Tags and Sensors $S_1, S_2, \ldots, S_n$ onboard the Hub.

Figure 3:
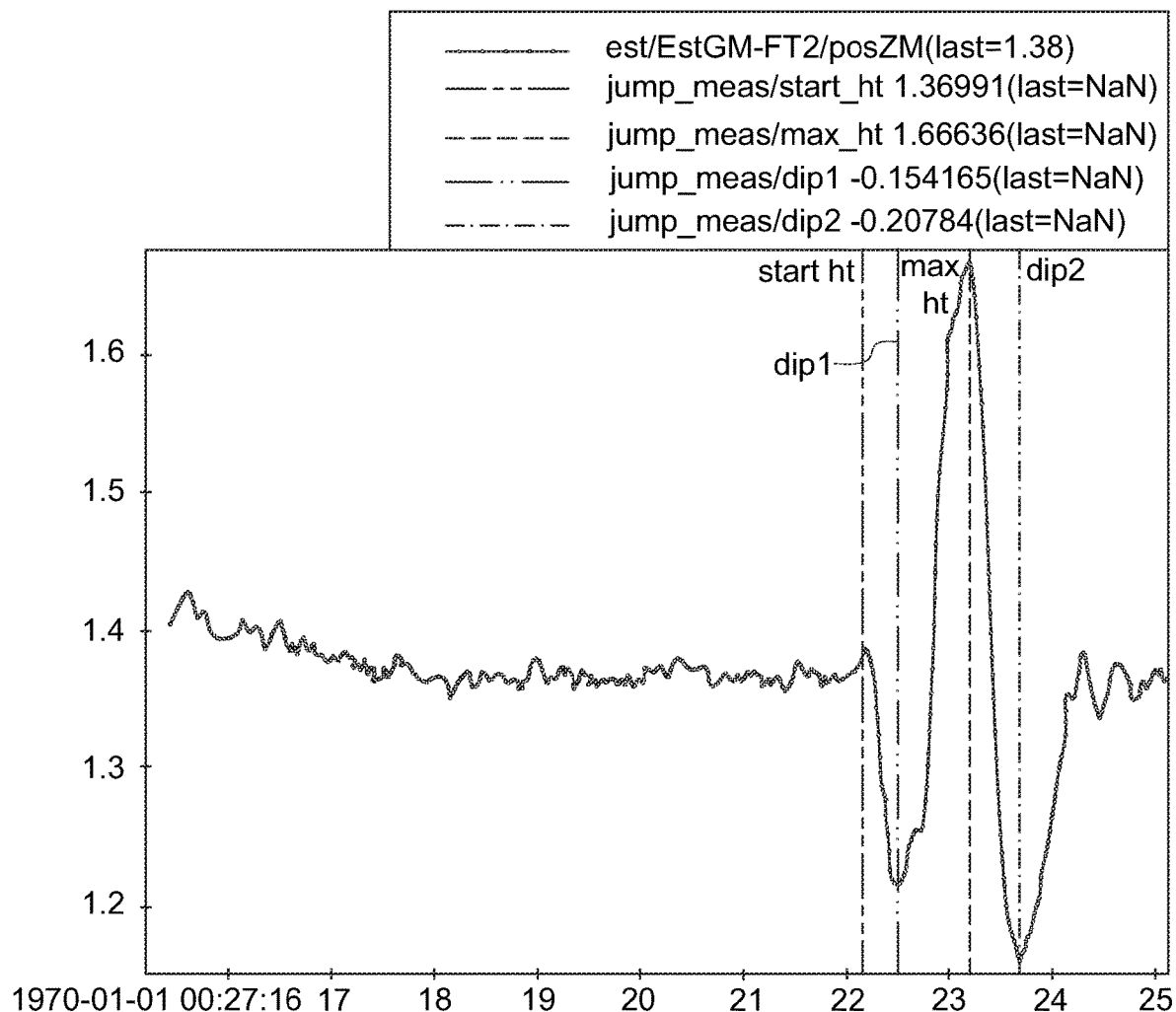
FIG. 3 is a graph of height vs time, showing an actual human jump captured at 100 Hz. One can discern the initial standing height (start ht) and the arm counter-movement (dip 1) before takeoff, the maximum height (max ht), the landing (dip 2) and the transients as the Tag and its belt settle after landing.
Figure 4:
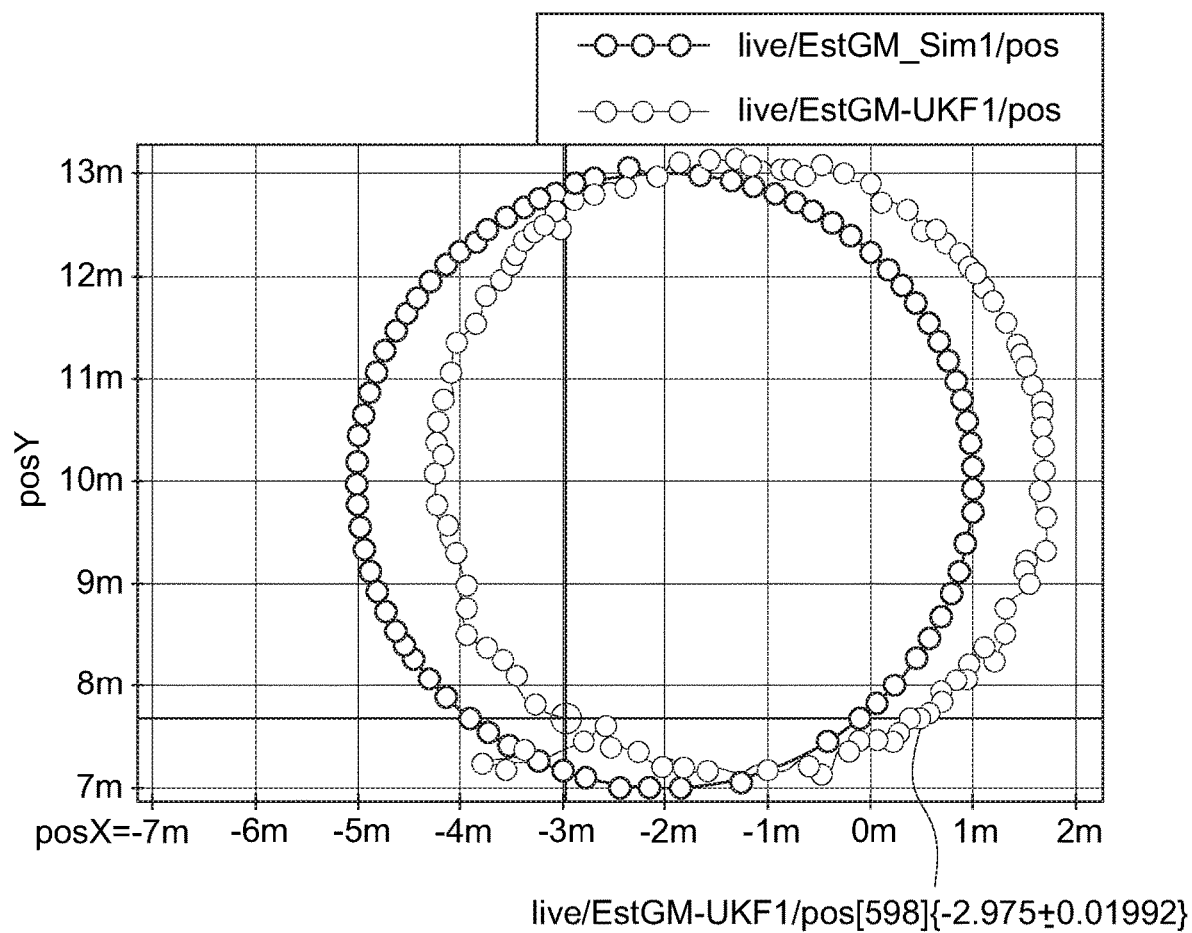
FIG. 4 is a plot illustrating the effects of too small an integer search in equation (19). The initial position was on the circle, but because of noise, the filter made and kept an integer ambiguity resolution error. The (true) simulated path was a circle of radius 3 centred on (−2, 10)

FIG. 3 shows a Plot of real data captured by the system with the subject wearing a belt with a Tag, showing an actual human jump captured at 100 Hz. One can discern the initial standing height (start ht), arm counter-movement (dip 1) before takeoff, the maximum height (max ht), the landing (dip 2) and the transients, as the Tag and its belt settle after landing;

FIG. 4 illustrates the effect of too small a search range (compared to equation 19). The initial position was on the circle, but because of noise, the filter made and kept an integer ambiguity resolution error. The true (simulated) path is a circle of radius 3 centred on (−2, 10), filter initialization error resulted in a shifted circle.

Figure 5:
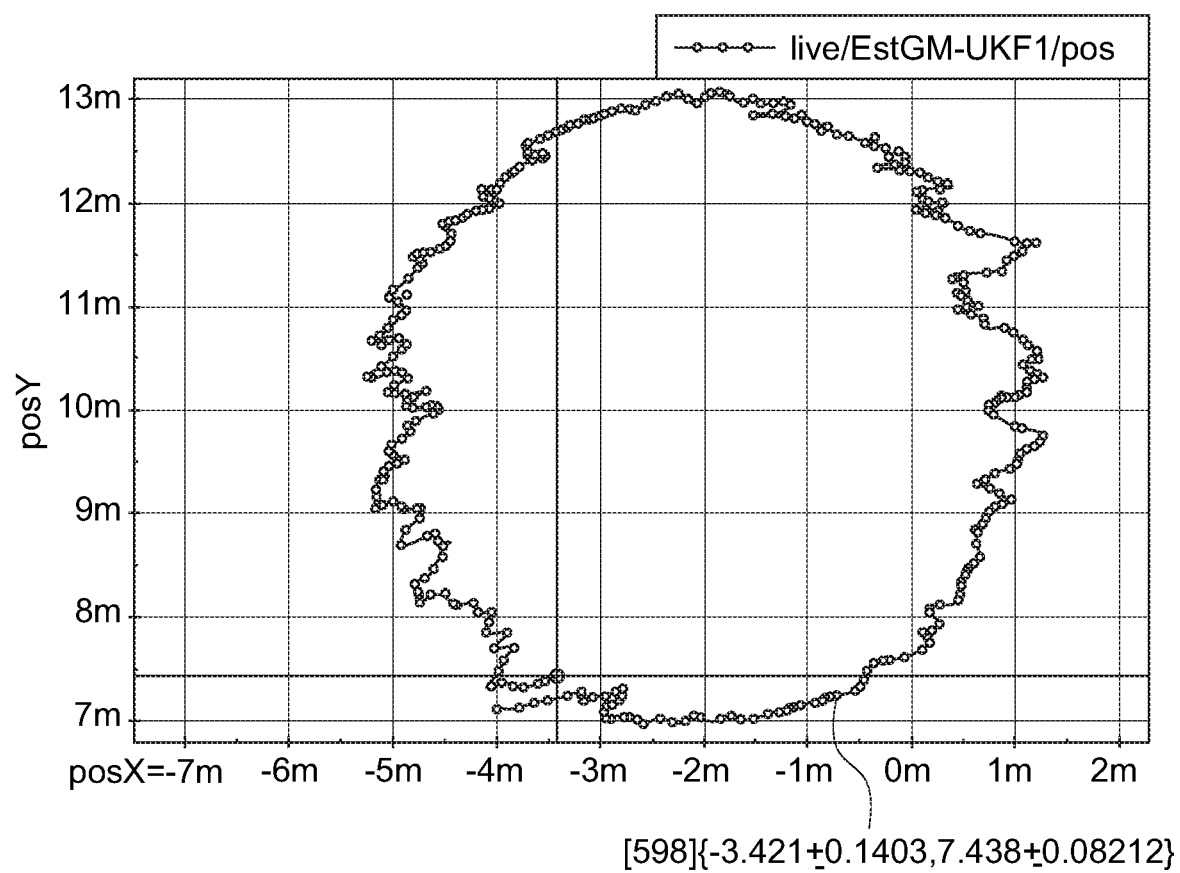
FIG. 5 is a plot illustrating the (less accurate) filter performance of range and delta range.

FIG. 5 illustrates the accuracy of embodiments of the invention using range and (less accurate) delta-range measurements.

Figure 6:
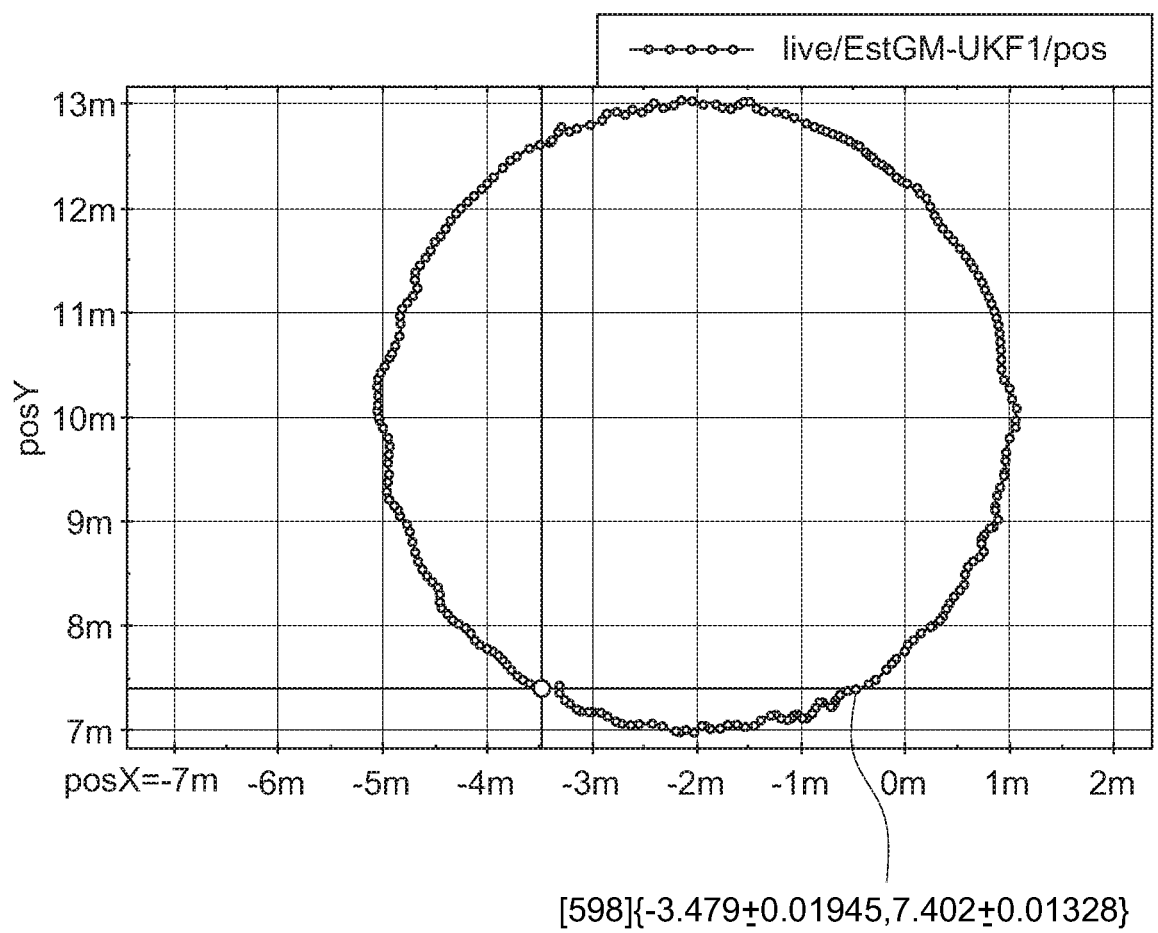
FIG. 6 is a plot illustrating the (more accurate) filter performance with range and delta phase with the filter correctly initialized.

FIG. 6 illustrates the accuracy of embodiments of the invention using range and (more accurate) delta-phase measurements (c.f. FIG. 5). Note the filter was correctly initialized unlike the filter in FIG. 3.

Figure 7:
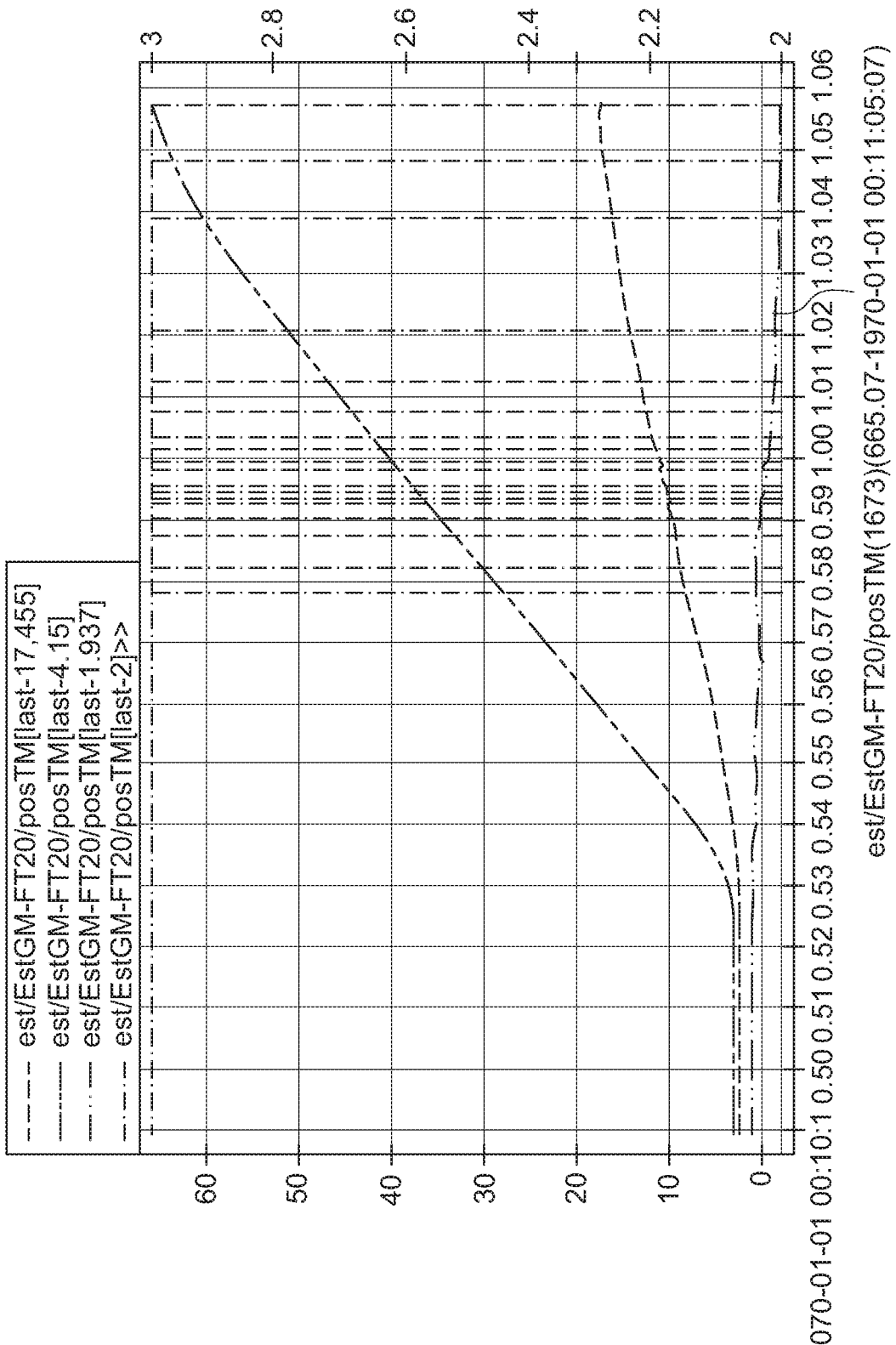
FIG. 7 is a plot of the x,y,z trajectories of a subject Sprint with and without post-processing correction of the initial integer hypothesis at the moment of handoff from range differences to phase differences.

FIGS. 4, 5 and 6 pertain to a simulation of circular motion. In these three cases, the three Sensors were disposed in an equilateral triangle on the Hub, whose base was parallel to the ground at a known height. The plane defined by the Sensors was normal to the y-axis (boresight). The simulations used a circle of radius of 3 m centered at (−2,10,1) relative to the Hub (2 m left of boresight and 10 m in front of the Hub, and at a height 1 m). The real Hub in FIG. 3 used a Sensor separation of 40 cm, whereas the simulated Hubs in FIGS. 4,5, and 6 used a Sensor separation of 1 m;

FIG. 7 shows x (est/EstGM-FT8/PosX), y (est/EstGM-FT8/PosY), z (est/EstGM-FT8/PosZ) sprint trajectories (FT8 refers to Tag #8). The trajectories starting at 29 seconds are the corrected trajectories where the best integer hypothesis was applied at the hand-off from delta range to delta-phase. The original (wrong trajectory) is due to the wrong delta-phase reconstruction in one or more of the Sensor pairs. This will therefore affect x and z trajectories since the filter will endeavour to remain consistent with respect to the initial choice of delta-phases. Notice how the post-processed x and z trajectories (starting at 29 sec) have very little error and the y-axis is very smooth (there is still some multipath induced error on the z-axis around 37 sec; the residual error on the x-axis is likely due to Hub miss-alignment).

Figure 8:
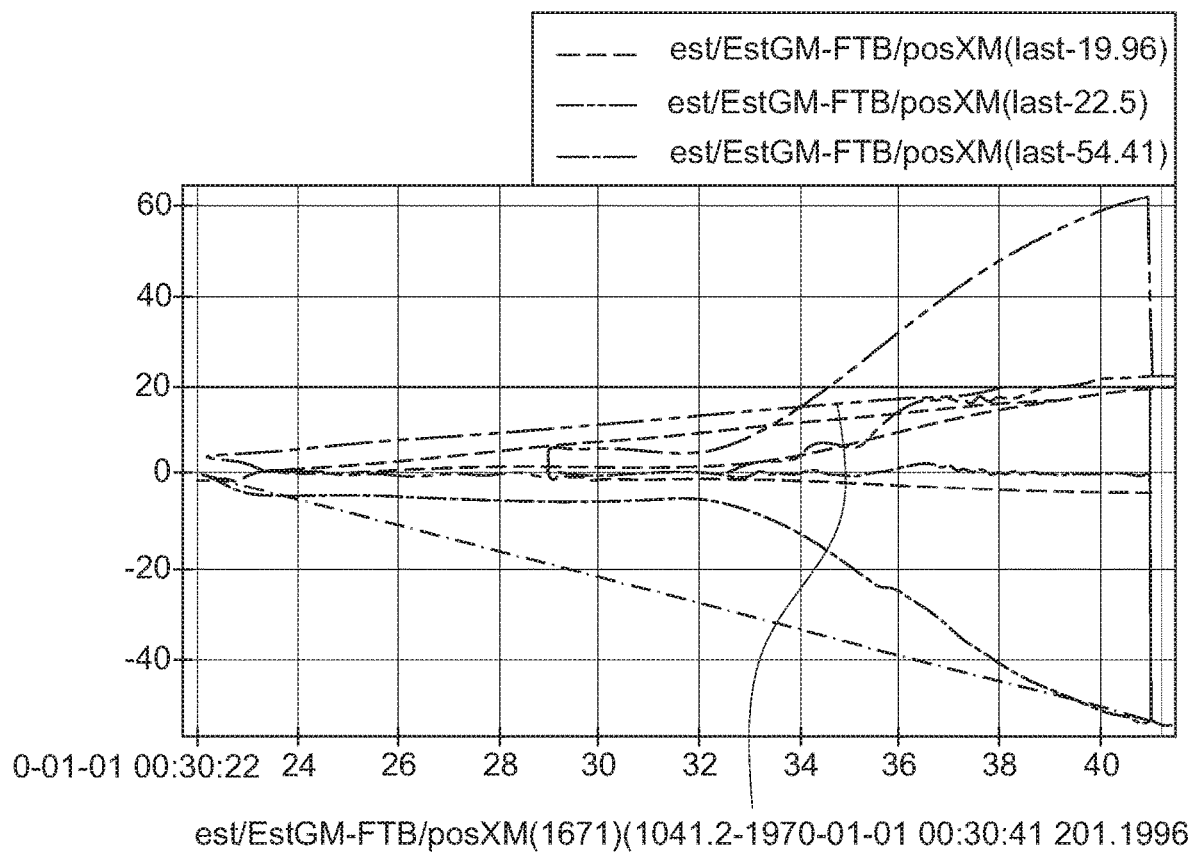
FIG. 8 is a plot of the x,y,z trajectories of a subject's sprint in which measurements from the top sensor were periodically unavailable on a Hub equipped with a sensor on the top and 2 on the bottom (arranged in an equilateral triangle).

FIG. 8 shows the x (est/EstGM-FT20/PosX), y (est/EstGM-FT20/PosY), and z (est/EstGM-FT20/PosZ) trajectories of a human subject sprinting (FT20 refers to Tag #20) and the state of the filter (est/EstGM-FT20/kfState). When the filter state is 3, all 3 sensors are being used. When it is 2, only the bottom two sensors are available/usable and hence only x-axis accuracy can be maintained. As is evident, no height (z-axis) constraint was imposed during these outages. The outages were short in this case, but the longer the outage, the greater the risk the filter will lose consistency with respect the delta-phase reconstruction after the outage.

Operation

When starting using only range measurements, the diagonal matrix $R_{meas}$ to be introduced in (12) must reflect the nature of the measurements used: range measurements will have a larger variance than the phase measurements. Thus when switching out range observables for phase observables, one must reflect this change in $R_{meas}$. But in all other respects, the dimensions of the matrices remain the same, thus enabling one to use the same filter structure.

For certainty, the preferred embodiment uses a couple of two-way range measurements, and either a couple of single range measurement differences or the corresponding single-phase differences. Thus, the number of observables is the same throughout the filter operation. The accuracy of the filter in the radial direction will be the same if using phase differences, but the accuracy in tangential directions will be much better when using phase differences (as contrasted in FIGS. 5 and 6 using single-difference ranges and phases respectively).

Assuming one starts on the correct cycle, a very good measure of the quality of agreement of the filter with the new measurements is the scalar $v^T (P^{yy})^{-1} v$ where v is the innovation, and $P^{yy}$ is the measurement covariance matrix. It is updated every time new measurements are fed to the filter (but does not change within an update epoch).

Let $\psi_i$ be the full range from the Tag to the $i^{th}$ Sensor. In embodiments, the full single difference range between Sensor i and j using the low-noise phase difference $\Delta\phi_{ij} = \phi_i - \phi_j$ can be calculated via, $$\Delta\psi_{ij} = \Delta\phi_{ij} + \lambda * \text{round}((\Delta R_{ij} - \Delta\phi_{ij})/\lambda) \quad (1)$$

(where $\Delta R_{ij} = R_i - R_j$ and $\lambda$ is the carrier frequency).

The shortcoming to this method is that the noise on the delta range measurements can induce a multiple-of-$\lambda$ error $\Delta\psi_{ij}$. It is for this reason that the UKF filter is used in the machine calculations encompassed by the embodiments of the invention.

The CPU first initializes the UKF filter with an a priori state $x_0$ of dimension L and a corresponding covariance $P_0$, as described below:

$$\hat{x}_0 = E[x_0] \quad (2)$$

$$P_0 = E[(\hat{x}_0 - x_0)(\hat{x}_0 - x_0)^T] \quad (3)$$

Then the 2L+1 sigma points used for the unscented transformation are calculated:

$$X^0_{k-1|k-1} = E[X_{k-1|k-1}] i = 0 \quad (4)$$

$$X^i_{k-1|k-1} = X^0_{k-1|k-1} + ((L+\lambda)P_{k-1|k-1})^{1/2}_i - L \le i \le L, i \ne 0 \quad (5)$$

where $((L+\lambda)P_{k-1|k-1})^{1/2}_i$ is the $i^{th}$ eigenvector of the matrix $((L+\lambda)P_{k-1|k-1})^{1/2}$ The sigma points are then propagated in time via the function f:

$$X^i_{k|k-1} = f(X^i_{k-1|k-1}) - L \le i \le L. \quad (6)$$

Now the CPU can define a set of weights for means and covariances:

$$w^m_i = w^c_i = 1/(2(L+\lambda)), -L \le i \le L, i \ne 0$$

$$w^m_0 = \lambda/(L+\lambda),$$

$$w^c_0 = \lambda/(L+\lambda) + (1 - \alpha^2 + \beta) \quad (7)$$

Where L is the dimension of the state space x, $\lambda = \alpha^2(L+\kappa) - L$ and $\alpha, \beta, \kappa$ are tuning constants usually with values such as 1e-4, 2 (for Gaussian distributions), and 0 respectively (c.f. [2]).

$$\hat{x}_{k|k-1} = \sum_{i=-L}^{L} w^m_i X^i_{k-1|k-1} \quad (8)$$

$$P_{k|k-1} = \sum_{i=-L}^{L} w^c_i (X^i_{k-1|k-1} - \hat{x}_{k|k-1})(X^i_{k-1|k-1} - \hat{x}_{k|k-1})^T + R_{proc} \quad (9)$$

(in the above $R_{proc}$ is the process noise covariance)

And the observations are made through a (typically) non-linear function H. This function maps the state back to measurement space:

$$Y^i_{k|k-1} = H(X^i_{k-1|k-1}) \quad -L \le i \le L \quad (10)$$

$$\hat{y}_{k|k-1} = \sum_{i=-L}^{L} w^m_i Y^i_{k|k-1} \quad (11)$$

Finally, the measurement update equations are utilized:

$$P^{yy}_{k|k} = \sum_{i=-L}^{L} w^c_i (Y^i_{k|k-1} - \hat{y}_{k|k-1})(Y^i_{k|k-1} - \hat{y}_{k|k-1})^T + R_{meas} \quad (12)$$

is the measurement covariance matrix ($R_{meas}$ is the measurement noise covariance), and $$P^{xy}_{k|k} = \sum_{i=-L}^{L} w^c_i (X_{k-1|k-1} - \hat{x}_{k|k-1})(Y^i_{k|k-1} - \hat{y}_{k|k-1})^T \quad (13)$$

is the state-measurement cross-covariance, and (note superscripts)

$$K_{k|k} = P^{xy}_{k|k} (P^{yy}_{k|k})^{-1} \quad (14)$$

is the Kalman gain. The final state update is:

$$\hat{x}_{k|k} = \hat{x}_{k|k-1} + K_{k|k}(y_k - \hat{y}_{k|k-1}) \quad (15)$$

where $y_k$ is the measured observation and $$v = y_k - \hat{y}_{k|k-1} \text{ is the innovation} \quad (16)$$

To evaluate the quality of the innovation, one uses the innovation inner product:

$$v^T P^{yy}_{k|k} v \quad (17)$$

The quantity in (17) is analogous to the argument of the probability density function used to rate the fit of new measurements with respect to a predicted state (the process according to embodiments of the invention have dispensed with the exponentiation and the rest of the normalization by the determinant of the measurement covariance). The innovation inner product introduced in Equation 17 is depicted in FIG. 1 as the "UKF" box diagram, and exploded process c.

Finally, $$P_{k|k} = P_{k|k-1} + K_{k|k} P^{yy}_{k|k} K^T_{k|k} \quad (18)$$

As for the slip detection/correction, the process starts with the right integer value for phase computations. Moving forward in time, an algorithm to overcome outliers due to the noise in $\Delta R_{ij}$ in (1) is needed.

To this end, an integer hypothesis perturbing (1) about the nominal value is proposed. Search_num $\ge 2\sigma(R_i)/\lambda$ where $\sigma(R_i)$ is herein selected as the standard deviation of the noise on $R_i$ (which is assumed independent and identically distributed). Specifically, the method loops around equations 15, 16 & 17 and records the integer correction yielding the smallest value in (17). This should correspond to k=0 in (19) when a single difference range happens to have almost no noise.

$$\Delta\hat{\psi}_{ij}(k) = \Delta\phi_{ij} + \lambda * \text{round}((\Delta R_{ij} - \lambda)/\lambda) * k \quad (19)$$

for $-\text{search\_num} \le k \le \text{search\_num}$. FIG. 4 shows the result of a simulation of data run through equation (19), where too small an integer search is performed.

More generally, when using n Sensors, there will be up to n(n−1)/2 pairs of non-redundant combinations to use in the UKF method according to embodiments of the invention.

Thus, the algorithm to employ in computer processes to ensure staying on the initial integer combination is as follows:

```
        for (sensor_{o1}_cycle = -search_num; sensor_{o1}_cycle <=
search_num; sensor_{o1}_cycle++)
{
        for (sensor_{o2}_cycle = -search_num; sensor_{o2}_cycle <=
search_num; sensor_{o2}_cycle++)
        {
                .............................
                for (sensor_{ij}_cycle = -search_num; sensor_{ij}_cycle <=
search_num; sensor_{ij}_cycle++)
                {
                        Δψ̂_{o1} += λ * sensor_{o1}_cycle;
                        Δψ̂_{o2} += λ * sensor_{o2}_cycle;
                        .........
                        Δψ̂_{ij} += λ * sensor_{ij}_cycle;
                        Re-computing equations (16) and (17) with the new apriori
measurements:
                        Cache v and compute the innovation inner product in (17)
        }}}
```

Finally, compute the state update in (15) with the innovation v corresponding to the smallest value of the innovation inner product in (17).

In practice, satisfactory performance is obtained with at least one Tag. In embodiments of the invention, there is one Tag. In other embodiments of the invention, the Hub can track multiple Tags, each moving independently of each other.

Other improvements to the above involve post-processing recorded data in which the wrong initial integer hypothesis was used to reconstruct full delta phases. The consequences of such a wrong guess are generally a diverging Tag z-axis values (if worn on a flat surface) or x-axis trajectory if running directly down-range from the Hub. In activities (such as a Sprint) where there is a posteriori metric to detect a divergent trajectory, it is possible to replay the activity with a sequence of integer hypotheses (ie adding λk to R.H.S of (1) for k=-n, ... , -1, 0, 1, 2, ... ,n) at the hand-off from delta-ranges to delta-phases, and pick the value of k which minimizes any divergence w.r.t. the x or z axis (or any other metric one cares to minimize). This is illustrated in FIG. 7.

In addition, because of destructive interference, diffraction, or other RF effects, it is possible that one or more sensors on the Hub cannot adequately receive the Tag's reply. It is therefore advantageous to reconfigure the filter operation on-the-fly to use the remaining valid observables (in range and/or phase). If one of three Sensors is impaired, it may (in certain circumstances) be beneficial to apply an artificial Tag 'height constraint' to make up for the lost observables. The result of such a reconfiguration can be seen in FIG. 8.

In this disclosure, the word "comprising" is used in a non-limiting sense to mean that items following the word are included, but items not specifically mentioned are not excluded. It will be understood that in embodiments which comprise or may comprise a specified feature or variable or parameter, alternative embodiments may consist, or consist essentially of such features, or variables or parameters. A reference to an element by the indefinite article "a" does not exclude the possibility that more than one of the elements is present, unless the context clearly requires that there be one and only one of the elements.

In this disclosure the recitation of numerical ranges by endpoints includes all numbers subsumed within that range including all whole numbers, all integers and all fractional intermediates (e.g., 1 to 5 includes 1, 1.5, 2, 2.75, 3, 3.80, 4, and 5 etc.). In this disclosure the singular forms an "an", and "the" include plural referents unless the content clearly dictates otherwise. Thus, for example, reference to a composition containing "a compound" includes a mixture of two or more compounds.

In this disclosure term "or" is generally employed in its sense including "and/or" unless the content clearly dictates otherwise.

In this disclosure "receiver" includes an antenna.

An embodiment of the present invention relates to a computer storage product with a non-transitory computer-readable medium having computer code thereon for performing various computer-implemented operations. The computer-readable media and computer code may be those specially designed and constructed for the purposes of the present invention, or they may be of the kind well known and available to those having skill in the computer software arts.

Examples of computer-readable media include, but are not limited to: programmable logic devices ("PLDs") and ROM and RAM devices including Flash RAM memory storage cards, sticks and chips, for example magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), for example. Examples of computer code include machine code, such as produced by a compiler, and files containing higher-level code that are executed by a computer using an interpreter. For example, an embodiment of the invention may be implemented using HTML5, XML, JavaScript, Java, C#, C++, Objective C, or any other suitable known scripting, markup and/or programming languages and development tools. Another embodiment of the invention may be implemented in hardwired circuitry in place of, or in combination with, machine-executable software instructions.

The present invention will be more readily understood by referring to the following examples which are given to illustrate the invention rather than to limit its scope.

Example 1

Subject Location Calculation

The Tag location system is described in FIG. 2 with a Hub (1) containing a CPU (2) and a series of Sensors $S_1, \ldots, S_n$ generating range and phase information corresponding to Tags $T_1, \ldots, T_m$.

As depicted in FIG. 1, the range information is passed from the control board in (a) to a point solver in (b) (for example a least squares solver) to compute an initial position for the UKF in (c).

This is in the initial position used in equation (2) where the velocity and acceleration components can be set to zero.

Once in (c), the UKF operates using range and single difference phase, and the initial position is averaged until it is of good enough quality to switch to using only range and single phase difference information. This determined by a threshold on the innovation inner product defined in equation (17).

The loop over finite full phase difference possibilities as in (19) or the rightmost box in FIG. 1 is undertaken until the smallest of the innovation inner product is found. The filter output corresponding to that choice of cycles is then used.

In the preferred embodiment, one uses the range and phase measurements from an UWB RF (Radio Frequency) sensor, such as a DecaWave™ Sensor (available from Decawave Corp., Adelaide Chambers, Peter Street, Dublin, D08 T6YA, Ireland), to also provide carrier-phase information, as well as received signal levels for integrity purposes.

While preferred embodiments have been described above and illustrated in the accompanying drawings, it will be evident to those skilled in the art that modifications may be made without departing from this disclosure. Such modifications are considered as possible variants comprised in the scope of the disclosure.

Publications referred to:

Genovese, A. F. (2001) The Interacting Multiple Model Algorithm for Accurate State Estimation of Maneuvering Targets. *APL Technical Digest*, 22, 614-623.

Jonge, P. J. d. & C. C. J. M. Tiberius. 1996. *The LAMBDA-method for integer ambiguity estimation: implementation aspects*. Delft: Delft Geodetic Computing Centre.

Wan, E. A. & R. Van Der Merwe. 4 Oct. 2000. The unscented Kalman filter for nonlinear estimation. In *IEEE 2000 Adaptive Systems for Signal Processing, Communications, and Control Symposium*. Lake Louise, Alberta, Canada: IEEE.

The invention claimed is:

1. A subject location system comprising:
   at least one tag associated with a subject, wherein the at least one tag is configured to receive and send a tag-specific range signal and a tag-specific phase signal;
   a plurality of sensor, wherein each sensor of the plurality of sensors is configured to receive the tag-specific range signal and the tag-specific phase signal from the at least one tag; and
   a master processing unit in communication with the plurality of sensors, wherein the master processing unit is configured to:
      for a point in time, calculate a range difference based on a difference in the tag-specific range signal received by different sensors of the plurality of sensors and a phase difference based on a difference in the tag-specific phase signal received by the different sensors of the plurality of sensors;
      initialize a tag position algorithm to generate an initial position of the at least one tag by averaging a plurality of position solutions to determine an averaged position solution, the plurality of position solutions calculated based on the tag-specific range signal and the range difference; and
      after the tag position algorithm is initialized, apply a tag position refinement filter to generate a refined position of the at least one tag based on the tag-specific range signal and the phase difference.

2. The subject location system of claim 1, wherein the master processing unit is configured to calculate the phase difference based on an integer hypothesis and is further configured to:
   iterate through a plurality of integer hypotheses to determine an integer which results in a smallest value of an innovation inner product consistent with the averaged position solution; and
   apply the tag position refinement filter to generate the refined position of the at least one tag based on the tag-specific range signal and the phase difference based on the integer.

3. The subject location system of claim 2, wherein the master processing unit is further configured to:
   after the tag position refinement filter is applied and in response to determining that an error occurred in calculation of the phase difference, reiterate through the plurality of integer hypotheses to determine an alternative integer which results in a different value of the innovation inner product consistent with the averaged position solution; and
   re-apply the tag position refinement filter to generate the refined position of the at least one tag based on the tag-specific range signal and the phase difference based on the alternative integer.

4. The subject location system of claim 1, wherein the master processing unit is further configured to:
   after the tag position algorithm is initialized, remove outliers from the plurality of position solutions based on the averaged position solution; and
   redetermine the averaged position solution based on the plurality of position solutions without the outliers.

5. The subject location system of claim 1, wherein the master processing unit is further configured to:
   before the tag position algorithm is initialized, constrain the plurality of position solutions to an a priori z-axis value.

6. The subject location system of claim 1, wherein the plurality of sensors are stationary and the at least one tag is configured to dynamically move relative to the plurality of sensors.

7. The subject location system of claim 1, wherein the at least one tag is stationary and the plurality of sensors are configured to dynamically move relative to the at least one tag.

8. The subject location system of claim 1, wherein the at least one tag is configured to receive and send at least one of the tag-specific range signal and the tag-specific phase signal as an ultra-wideband signal.

9. The subject location system of claim 1, wherein the at least one tag is configured to receive and send at least one of the tag-specific range signal and the tag-specific phase signal as a narrow band signal.

10. The subject location system of claim 1, wherein the at least one tag associated with the subject comprises a plurality of tags associated with the subject, wherein each tag of the plurality of tags is configured to receive and send a corresponding tag-specific range signal and a corresponding tag-specific phase signal.

11. The subject location system of claim 1, wherein the master processing unit is configured to:
   calculate the range difference and the phase difference by:
      using the tag-specific range signal received by a subset of sensors of the plurality of sensors to calculate an approximate range difference; and
      using the tag-specific phase signal received by the subset of sensors to calculate an approximate phase difference;
   initialize the tag position algorithm by initializing the tag position algorithm based on the tag-specific range signal received by the subset of sensors and the approximate range difference; and
   apply the tag position refinement filter based on the tag-specific range signal received by the subset of sensors and the approximate phase difference.

12. A method of determining a position of a subject associated with at least one tag, wherein the at least one tag is configured to receive and send both a tag-specific range signal and a tag-specific phase signal, the method comprising:
   receiving, at a plurality of sensors, the tag-specific range signal and the tag-specific phase signal from the at least one tag for a point in time;

calculating, by a master processing unit in communication with the plurality of sensors, a range difference based on a difference in the tag-specific range signal received by different sensors of the plurality of sensors and a phase difference based on a difference in the tag-specific phase signal received by the different sensors;

initializing, by the master processing unit, a tag position algorithm to generate an initial position of the at least one tag by averaging a plurality of position solutions to determine an averaged position solution, the plurality of position solutions calculated based on the tag-specific range signal and the range difference; and applying, by the master processing unit and after the tag position algorithm is initialized, a tag position refinement filter to generate a refined position of the at least one tag based on the tag-specific range signal and the phase difference.

13. The method according to claim 12, wherein the phase difference is calculated based on an integer hypothesis and further wherein:

calculating the phase difference comprises reiterating, by the master processing unit, through a plurality of integer hypotheses to determine an integer which results in a smallest value of an innovation inner product consistent with the averaged position solution; and applying the tag position refinement filter comprises applying the tag position refinement filter to generate the refined position of the at least one tag based on the tag-specific range signal and the phase difference based on the integer.

14. The method according to claim 13, further comprising:

determining, by the master processing unit and after the tag position refinement filter is applied, that an error occurred in calculating the phase difference;

re-iterating, by the master processing unit, through the plurality of integer hypotheses to determine an alternative integer which results in a different value of the innovation inner product consistent with the averaged position solution; and re-applying the tag position refinement filter to generate the refined position of the at least one tag based on the tag-specific range signal and the phase difference based on the alternative integer.

15. The method according to claim 12, further comprising:

removing, by the master processing unit and after the tag position algorithm is initialized, outliers from the plurality of position solutions based on the averaged position solution; and redetermining, by the master processing unit, the averaged position solution based on the plurality of position solutions without the outliers.

16. The method according to claim 12, further comprising:

constraining, by the master processing unit and before the tag position algorithm is initialized, the plurality of position solutions to an a priori z-axis value.

17. The method according to claim 12, wherein the plurality of sensors are stationary and the at least one tag is configured to dynamically move relative to the plurality of sensors.

18. The method according to claim 12, wherein the at least one tag is stationary and the plurality of sensors are configured to dynamically move relative to the at least one tag.

19. The method according to claim 12, wherein the at least one tag is configured to receive and send at least one of the tag-specific range signal and the tag-specific phase signal as an ultra-wideband signal.

20. The method according to claim 12, wherein the at least one tag is configured to receive and send at least one of the tag-specific range signal and the tag-specific phase signal as a narrow band signal.

21. The method according to claim 12, wherein the at least one tag associated with the subject comprises a plurality of tags associated with the subject, wherein each tag of the plurality of tags is configured to receive and send a corresponding tag-specific range signal and a corresponding tag-specific phase signal.

22. The method according to claim 12, wherein:

calculating the range difference comprises calculating an approximate range difference based on a difference in the tag-specific range signal received by a subset of sensors of the plurality of sensors and calculating the phase difference comprises calculating an approximate phase difference based on a difference in the tag-specific range signal received by the subset of sensors;

initializing the tag position algorithm comprises initializing the tag position algorithm based on the tag-specific range signal received by the subset of sensors and the approximate range difference; and applying the tag position refinement filter comprises applying the tag position refinement filter based on the tag-specific range signal received by the subset of sensors and the approximate phase difference.

\* \* \* \* \*